May 25, 1937.                C. ROUX ET AL                2,081,679
                         SELF RELEASING CLUTCH
                       Filed Oct. 13, 1930        8 Sheets-Sheet 8

Patented May 25, 1937

2,081,679

UNITED STATES PATENT OFFICE 2,081,679

SELF-RELEASING CLUTCH

Charles Roux and Louis Eugène Clémencet, Paris, France

Application October 13, 1930, Serial No. 488,524
In France March 10, 1930

32 Claims. (Cl. 74—9)

The present invention relates in general to self-releasing clutches suitable for a great number of applications and more particularly has reference to internal combustion engine starters.

An object of the present invention is to provide a self-releasing clutch of the type in which a pinion mounted on a shaft is axially displaced upon rotation of the shaft into mesh with a gear to be rotated and in which the shaft and pinion each have a helical spring attached thereto, the two springs being interthreaded.

Another object of this invention is to provide a starter drive for internal combustion engines, including a driving member adapted to engage and drive a member of the engine to be started, a power member, and means for actuating said driving member comprising at least one spiral spring anchored at one end to the power member, at least one spiral spring anchored at one end to the driving member and having its free end normally nested with the free end of said first-mentioned spring whereby, upon effecting relative rotation between said power member and driving member, said springs will unthread, and means for limiting the unthreading of said springs to maintain an appreciable portion of said free ends interthreaded, whereby when said driving member is engaged with the member of the engine to be started torque is transmitted thereto through the resiliency of said springs and the friction between the sides thereof.

Still another object of this invention is to provide a self-releasing clutch, comprising a driving shaft, a group of springs encircling the shaft, each having one end fixed thereto and the opposite end free and unbent, a driving gear loosely mounted for longitudinal and rotary movement on the shaft, a second group of springs encircling the shaft, each having one end fixed to the gear and the opposite end free and unbent, the two groups of springs being alternately intermeshed, and the springs of one group being nested with the springs of the other group, and means for limiting longitudinal movement of said gear upon rotation of said driving shaft whereby, when the movement of said gear is limited and a load is impressed thereon, driving torque will be transmitted thereto by means of the resiliency of said springs and the frictional resistance between said groups of springs.

A further object of this invention is to provide a method of starting an internal combustion engine which comprises first rotating a drive member to cause the same to advance in a longitudinal direction to engage a member of the engine to be started, secondly transmitting driving torque to said driving member by friction between partially interthreaded resilient elements of substantially equal extent, and thirdly causing said driving member to disengage said member of the engine to be started after the latter is started.

With these and other important objects in view, which may be incident to our improvements, the invention resides in the parts and combinations to be hereinafter set forth and claimed, with the understanding that the several necessary elements comprising our invention may be varied in construction, proportions and arrangement, without departing from the spirit and scope of the appended claims.

According to the present invention, a driving member is loosely mounted on a shaft. The shaft and driving member each have a helical spring anchored thereto, the two springs being intermeshed whereby, upon relative rotation between the driving member and shaft being effected, threading or unthreading of the springs will take place and axial displacement of the driving member on the shaft will result. This axial displacement is utilized to bring the driving member into driving engagement with a member to be driven. When the engagement has been effected, further axial displacement is limited and the driving member and the driven member are rotated with the shaft. Upon the rotary speed of the driven member exceeding that of the shaft, the driving member will be rotated at a speed greater than that of the shaft and this relative rotation will produce a relative axial movement of the driving member along the shaft to disengage the driving member from the driven member. Thus, the device acts as a self-releasing clutch.

In order to make our invention more clearly understood, we have shown in the accompanying drawings means for carrying the same into practical effect without limiting the improvements in their useful applications to the particular construction which, for the purposes of explanation, have been made the subject of illustration.

In the drawings:

Fig. 16 is a front elevation of one of the elements employed in the form of the invention shown in Fig. 13.

As shown in Figs. 1 to 4, one form of the present invention embodies a shaft 1 rotated by a prime mover 2 which may be an engine of any type, a driving transmission, or even a hand drive. A pinion 6 is loosely mounted on shaft 1 for free rotary and axial movement. This pinion may be termed a driven member and is adapted to be displaced axially along shaft 1 to engage and mesh with gear wheel 19 mounted on shaft 20.

Figure 1:
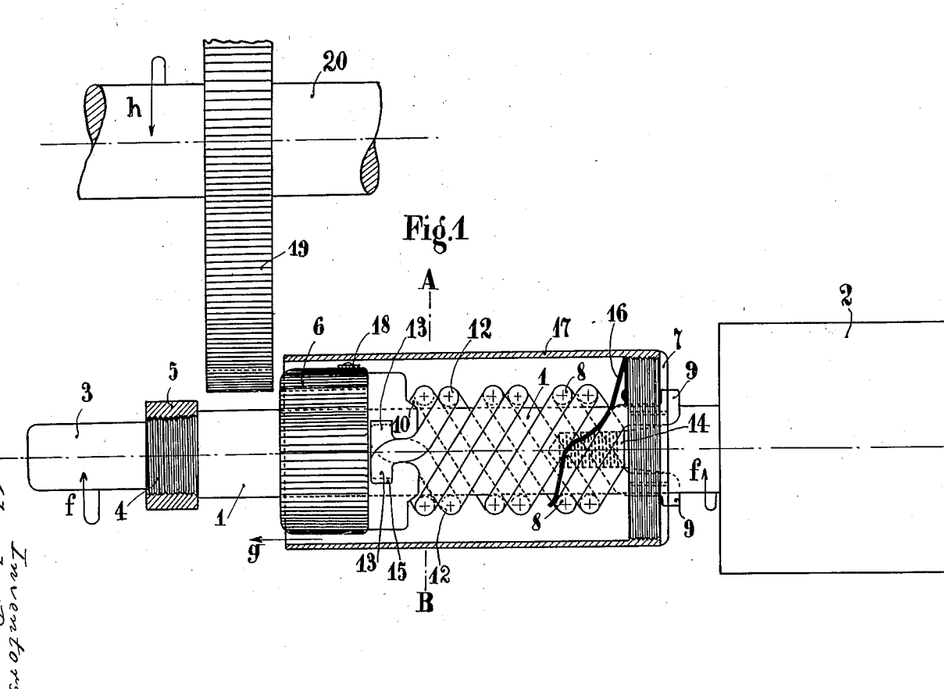
Figure 1 is an elevational view partly in longitudinal section of a device constructed according to the present invention.
Figure 2:
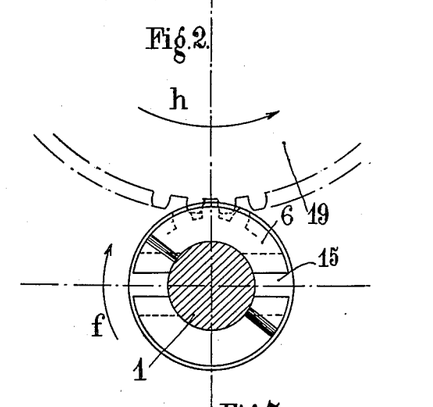
Fig. 2 is a partial sectional view taken on line A—B of Fig. 1 with a number of the parts removed.

Shaft 1 has an abutment or thrust ring 5 adjustably fixed thereon for limiting the longitudinal movement of pinion 6 along the shaft.

On the same shaft 1, a driving ring or member 7 is fixedly attached by some suitable means. The drawings represent this ring fixed on the shaft by threading. Any other affixing means may equally well be adopted. With this construction, the driving member 7 rotates with shaft 1 and serves to transmit power from shaft 1 to the driven member or pinion 6, as will appear hereinafter.

Figure 8:
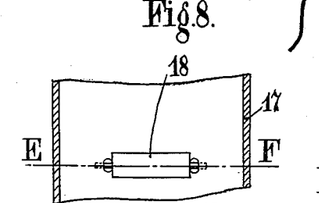
Fig. 8 is a fragmentary longitudinal sectional view of the casing for housing the mechanism of the present invention.
Figure 9:
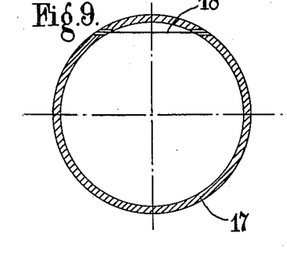
Fig. 9 is a sectional view taken on line E—F of Fig. 8.
Figure 10:
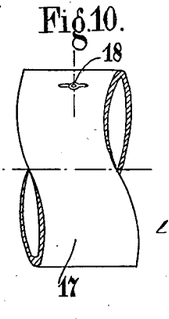
Fig. 10 is a fragmentary elevational view of the structure shown in Figs. 8 and 9.

Driving member or ring 7 carries a sleeve 17 which serves as a housing for the mechanism to be described hereinafter. Sleeve 17, as shown in Figs. 8, 9 and 10, is provided with a spring 18, the purpose of which will be described.

One or more helical springs 8 of round, square, or any other section, are mounted on shaft 1, with a certain amount of play and are connected or anchored to the driving member or ring 7 by their end 9. These springs move with the driving ring 7 and shaft 1, their other end 10 being free.

One spring 8 is sufficient, but in order to balance the pressures it is preferable to utilize two or more springs 8, the fixing points of which are conveniently distributed on driving member or ring 7.

Figure 3:
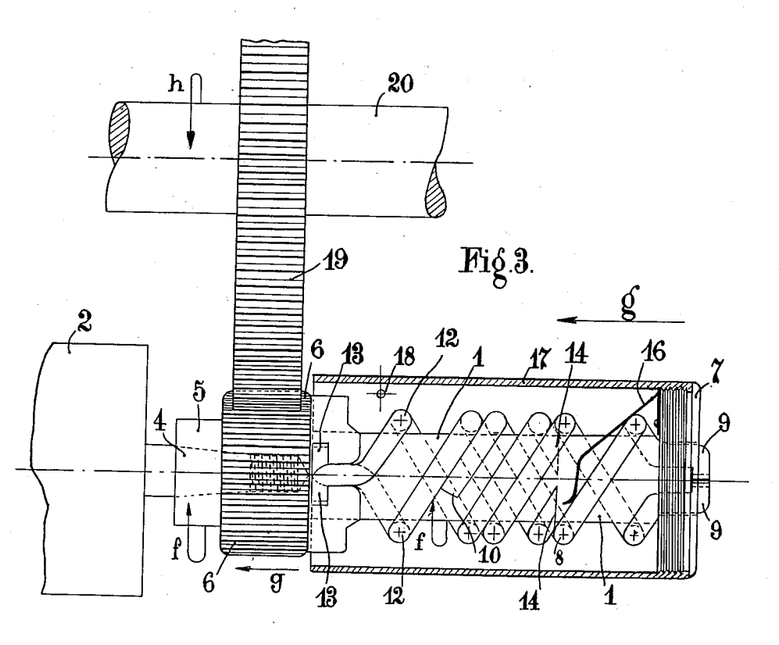
Fig. 3 is a view somewhat similar to that shown in Fig. 1 of a modified form of the invention.

In the construction shown in Figs. 1 and 3, two springs 8 are utilized, the fixed points of which are diametrically opposite on driving member 7.

The method of fixing one or more springs 8 to the driving ring 7 may vary and may consist in simply inserting the bent end 9 of each spring into a recess or groove 11 (Fig. 4) provided in the driving ring 7.

One or more springs 12, similar to springs 8, are connected by their ends 13 to pinion 6, their other ends 14 remaining free. These springs 12 are fastened to and move together with pinion 6 in its rotating and longitudinal or axial motion.

The spring or springs 12 are mounted loose on the shaft 1 for free rotary and longitudinal movement. As with springs 8, one spring 12 is sufficient, but in order to better balance the pressures, it is preferable to utilize two or more springs 12, the fixing points of which are conveniently distributed on pinion 6.

Figure 5:
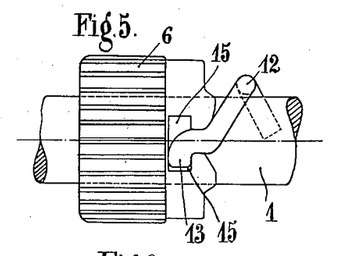
Fig. 5 is an elevational view illustrating the connection between the springs and driven pinion.
Figure 6:
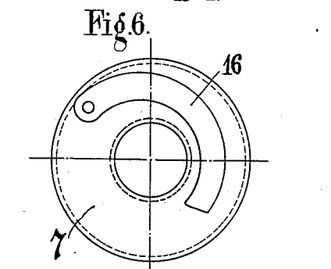
Fig. 6 is an elevational view of the driving ring employed in the construction of the present invention.
Figure 7:
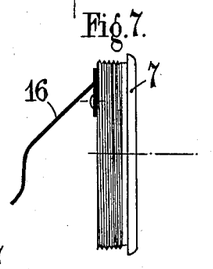
Fig. 7 is a side view of the element shown in Fig. 6.

In the construction shown in Figs. 1 and 3, two springs 12 are utilized, the fixed points of which are diametrically opposite. The method of fixing one or more springs 12 to the pinion 6 may vary as in the case of the springs 8 and may consist in simply inserting the bent end 13 of each spring into a recess 15 provided in the pinion 6 (Fig. 5).

The turns of the one or more springs 12 are engaged into the turns of the one or more springs 8. Thus, the spring or set of springs 8 are interthreaded or meshed with the spring or set of springs 12. Now, it will be realized that upon effecting relative rotation between springs 8 and 12, there will be a relative axial displacement between the springs due to their interthreaded relation. The present invention utilizes this phenomenon for shifting the pinion or driven member 6 along shaft 1 into meshing engagement with gear-wheel 19.

When the prime mover 2 is not running, the parts assume a position of rest, as shown in Fig. 1, with the spring or set of springs 12 substantially completely interthreaded with the spring or set of springs 8. With the spring or springs 12 in this position, the pinion 6 lies out of engagement with gear-wheel 19.

When under the action of prime mover 2, the shaft 1, the ring 7 and the spring or springs 8 anchored thereto start rotating in the direction of arrow f.

On account of inertia of the pinion 6 and of its spring or springs 12, rotary movement of pinion 6 will tend to lag behind rotation of shaft 1. Consequently, the turns of the spring or springs 8, rotating with shaft 1 and engaged against, or between the turns of the spring or springs 12, move against and between the turns of said spring or springs 12 and cause spring or springs 12, as well as pinion 6, to move along shaft 1 in the direction of arrow g. In other words, spring units 12 and 8 will partially unthread and spring unit 12 and its attached pinion 6 will move axially along shaft 1, as indicated above.

The teeth of pinion 6 engage into the teeth of the gear-wheel 19 and as soon as coupling is realized, the pinion 6, unable to turn on account of the resistance offered by gear-wheel 19, is forced to continue its longitudinal motion in the direction of the arrow g, until it meets and is stopped by the stop or abutment 5.

The position occupied at this instant by the pinion 6 on shaft 1 is shown in Fig. 3.

The pinion 6 and the attached spring or springs 12, retained by abutment 5 and unable to move longitudinally (direction of arrow g), are then driven in the direction of rotation of shaft 1 (direction of arrow f) by the spring or springs 8, fixedly attached in its rotation to ring 7 and consequently to shaft 1.

Pinion 6, in mesh with gear-wheel 19, rotates the latter in the direction of arrow h, thus causing gear-wheel 19 to rotate.

On account of the inertia of gear-wheel 19 and of mechanism driven by shaft 20, when starting to turn, the resistance to be overcome being superior to that subsequently necessary, the turns of the simple or multiple springs 8 and 12 of appropriate size are then compressed until the exercised stress surmounts the resistance of the gear-wheel 19 and the driven shaft 20.

Owing to the arrangement mentioned and on account of the inertia of the driven pieces, the springs 8 and 12, when gears 19—20 are started, will absorb through their conjugated elasticity any shocks that may occur.

At this point, it will be realized that rotary motion is transmitted from shaft 1 to pinion 6 solely by the resiliency of the partially interthreaded springs 8 and 12 and the frictional resistance between the interthreaded portions. Thus, the shocks due to engagement between pinion 6 and gear-wheel 19 and engagement between pinion 6 and stop ring 5 are absorbed both by the resiliency of the springs and the frictional resistance between the partially interthreaded springs.

If, due to an external cause, the driven shaft 20 and consequently its gear-wheel 19 start turning in the same direction (arrow h) faster than pinion 6, then pinion 6 will be driven by the gear-wheel 19. This will cause pinion 6 to rotate at a higher speed than shaft 1 and consequently produce a relative rotation between springs 8 and 12 in a direction opposite to that produced upon starting with pinion 6 at rest. As a result, the springs will shift from the partially interthreaded position of Fig. 3 to the substantially complete interthreaded position shown in Fig. 1. Thus, pinion 6 will be displaced out of engagement with gear 19 and declutching will be effected.

As the pinion 6 is shifted toward driving member 7, the former will engage spring 18. This spring will engage the teeth of pinion 6 and resiliently resist further movement of the pinion in any direction. Thus, the pinion will be held against accidental displacement and will not engage gear-wheel 19, due to vibration of the mechanism.

Pinion 6 is provided with a rounded or beveled edge at its leading end, to facilitate meshing with gear 19.

Fig. 3 is an illustration of a modification wherein the journal 3 (which, as shown in Fig. 1, is supported by a bearing) does not exist, the prime mover 2 operating the shaft 1 by its end 4. It is clear that the journal 3 might also be placed on the other end of the shaft 1.

One or several small leaf springs 16 may be fixed on the driving ring 7 and inserted between the respective turns of the springs 8 and 12 (Figs. 1, 3, 6 and 7).

When clutching in, as soon as the teeth of pinion 6 are brought in front of the teeth of gear-wheel 19, and if these teeth meet edge on, the spring or springs 16 yield by compression into the driving spring or springs 8 and spring or springs 12 until the teeth are brought to mesh. With this construction, the wear of pinion teeth 6 and of gear-wheel 19 is thus considerably reduced.

The insertion between the driving spring or springs 8 and ring 7 of more flexible springs may produce the same result as above. It is possible to combine such more flexible spring or springs with the spring or springs 16.

Figure 4:
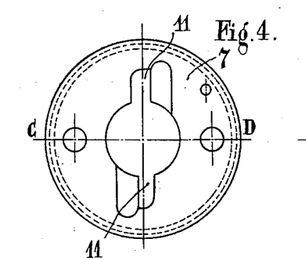
Fig. 4 is an elevational view of a driving ring forming part of the present invention.
Figure 4A:
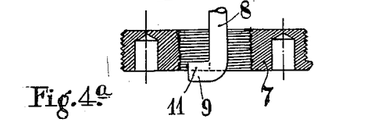
Fig. 4a is a sectional view taken on line C—D of Fig. 4.
Figure 11:
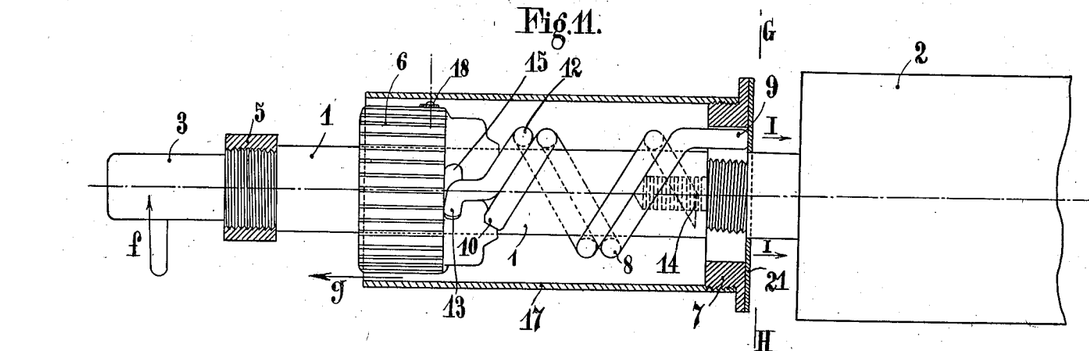
Fig. 11 is a fragmentary view partly in elevation and partly in longitudinal section showing a modification of the present invention.
Figure 12:
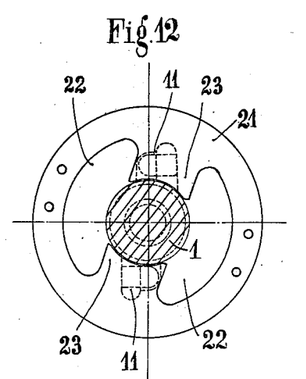
Fig. 12 is a sectional view taken on line G—H of Fig. 11.

The more flexible spring or springs or above spring or springs 16 may be replaced by one or several flexible washers forming spring 21 (Figs. 11 and 12) fixed on the driving ring 7 (Fig. 11). To increase their flexibility and consequently their acting as a spring, this or these washers may be slotted at 22 so as to present one or more spring-forming leaves placed in front of the recesses or grooves 11 of driving ring 7 (Fig. 4). The end 9 of each of the spring or springs 8 may engage into these grooves and have therein a certain longitudinal displacement. It is more desirable that the washer 21 should possess as many leaves 23 as there are springs 9 and consequently recesses or grooves 11.

As mentioned above, when clutching in, the flexible washer 21 and its leaves 23 yield in the direction of arrow l, until meshing of teeth of pinion 6 with the spaces of gear-wheel 19 is brought about, considerably reducing, as mentioned before, the wear of the teeth.

Figure 13:
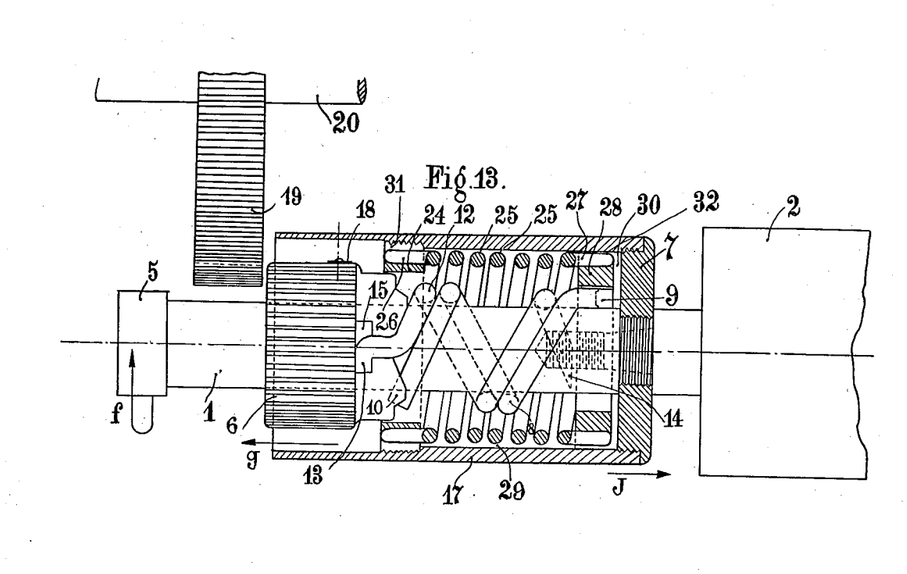
Fig. 13 is a view similar to Fig. 1, showing a further modified form of the present invention.

Another modification shown in Fig. 13 equally reduces, as mentioned above, the wear of the teeth of pinion 6 and those of gear-wheel 19 and allows more flexibility for starting the gear-wheel 19 when clutching is completed.

Figure 14:
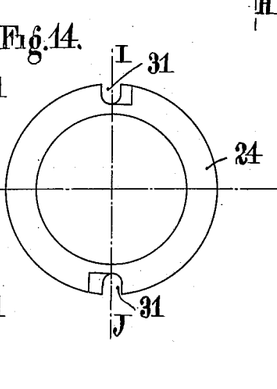
Fig. 14 is a plan view of an element employed in applicants' construction.
Figure 14A:
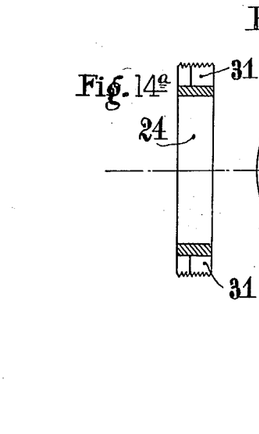
Fig. 14a is a sectional view taken on line I—J of Fig. 14.

In this modification, the shaft 1 carries a driving member or ring 7 as in the form shown in Fig. 1. The sleeve 17, however, is of heavier construction and is fixedly secured to the driving member 17. A ring 24 (Fig. 14) is fixed with the tube or sleeve 17 and has one end 26 of one or more helical springs 25 (Fig. 15) anchored thereto. These springs 25 which may be of round, square or any other section have their other ends 27 anchored to a ring 28 (Fig. 16) loosely mounted on shaft 1.

The combined arrangement of the rings 24 and 28 and of spring or springs 25 is suitably disposed, so as to allow a certain space or play 29 between the spring or springs 25 and the casing-tube 17 and a certain space or play 30 between the loose ring 28 and driving ring 7.

In case of several springs 25, the turns of same may be intermeshed. One spring 25 suffices, but in order to better balance the pressures, it is preferable to use two or more springs 25, the fixing points of which (26 and 27) to the rings 24 (Fig. 14) and 28 (Fig. 16) are regularly spaced.

Figure 15:
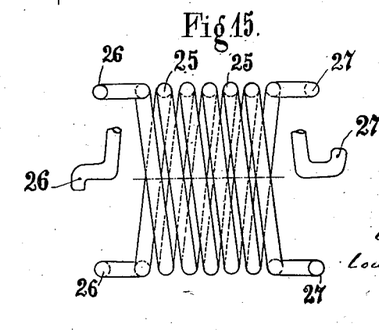
Fig. 15 is a detailed elevational view of the springs employed in the form of the invention shown in Fig. 13.

Fig. 15 shows two springs 25 having the turns intermeshed, as mentioned above, the fixing points 26 and 27 on the rings 24 and 28 being diametrically opposed.

Figures 15, 16A:
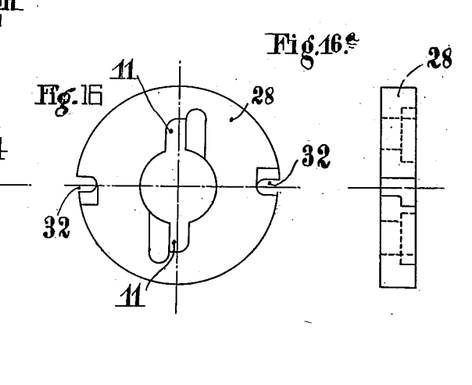
Fig. 16a is a side elevation of the element shown in Fig. 16.

The arrangement of fixing the spring or springs 25 to the rings 24 and 28 may be similar to that previously described for the fixing of end 9 of the springs 8 to the driving ring 7, each of their bent ends being, for instance, inserted into a recess or groove 31 provided in the ring 24 (Fig. 14) and each of their other bent ends 27 inserted for instance into a similar groove 32 of the ring 28 (Fig. 16).

In the embodiment (Fig. 13) of the present invention, the spring or springs 8 are anchored to the ring 28 which is driven through springs 25 by the driving ring 7. The spring or springs 8 are interthreaded with and cooperate with the spring or springs 12 of pinion 6 in the same manner as described in connection with Fig. 1.

In operation, the shaft 1 starts to rotate in the direction of arrow f and the loose ring 28 is forced into this motion by the spring or springs 25, forced themselves to rotate by the ring 24 attached to shaft 1 through tube-casing 17 and driving ring 7.

The ring 28, in its rotation, forces into motion the spring or springs 8, the turns of which rotate against or between the turns of the spring or springs 12 fixed to pinion 6. The latter moves in the direction of arrow g and the clutching of this pinion with gear-wheel 19 is brought about, as previously mentioned in connection with Figs. 1 and 3.

As mentioned above, if, when operating the device, the meshing of the teeth of pinion 6 with the spaces of gear-wheel 19 is not brought about, the ring 28 will slightly slip back in the direction of arrow j, slightly bending the spring or springs 25 until the teeth are caused to mesh, rendering thus the meshing of pinion teeth 6 with those of gear-wheel 19 more flexible, when clutching is being effected.

When clutching is brought about, that is, at the instant the pinion 6 is caused to check against abutment 5, the gear-wheel 19 is started, as previously indicated. At this moment, owing to the inertia of the driven pieces, the ring 28, which may also rotate on shaft 1, rotates through a certain angle allowed by the elasticity of the spring or springs 25, the latter then operating by torsion.

In other words, at the instant of starting, this ring 28 undergoes a lagging effect of rotation in the direction of arrow f, allowed by the elasticity of the spring or springs 25, operating by torsion. The flexibility effect of the spring or springs 25 is thus added to the conjugated effect of the springs 8 and 12.

It is seen that this device results in conferring still more flexibility to the clutch.

Declutching is done automatically and in the same way as previously explained in connection with Fig. 1, the gears of this device returning to the position occupied before clutching in.

The clutching device may, of course, be arranged to operate in the direction of rotation contrary to that shown by arrow f. In this case the winding direction of the turns of springs 8—12 and 25 would be effectuated in the direction contrary to that indicated.

The winding direction of the turns of spring or springs 25 is immaterial, but they should preferably be wound in a direction contrary to that of springs 8 and 12.

In describing the present invention, reference has been made to several constructions for anchoring the ends of springs to the pinion and other members. The invention embodies several modifications of this construction.

Figure 17:
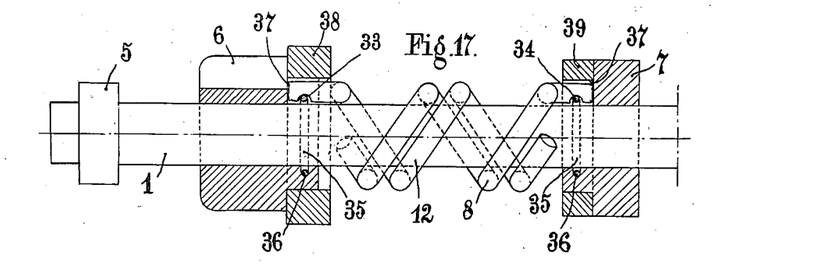
Fig. 17 is a fragmentary longitudinal sectional view illustrating a modified form of construction for anchoring the springs.

In Fig. 17, the springs 8 and 12 are provided with cuttings or slots 34 and 33, disposed on the inner face thereof.

The driving ring 7 and pinion 6 each have a groove 35 carrying an elastic split ring 36. Fig. 17 shows how the springs 8 and 12 are respectively fixed on driving ring 7 and pinion 6. The spring 8 is engaged into a slot 37 of the driving ring 7, the spring 12 being engaged into a similar slot 37 of pinion 6.

The cuttings 34 and 33 respectively of spring 8 and spring 12 are caused to grip on split ring 36.

Figure 18:
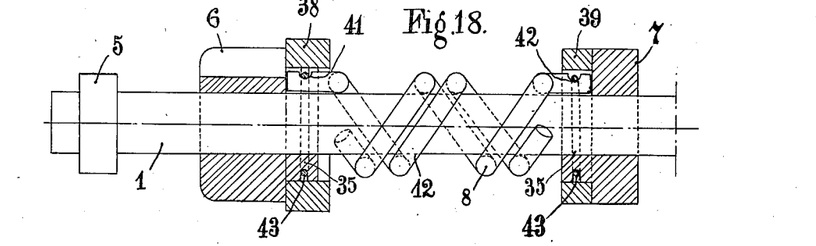
Fig. 18 is a similar view showing another modification.

In the form of construction shown in Fig. 18, slots 41 and 42 have been provided on the external side of the springs; these slots are located in the split rings 43 adjusted by elasticity or pressure or any other means.

It is easily understood that the setting and removing of the springs may only be effected when shaft 1 is withdrawn. When this shaft is in position, the above springs are unable to disengage.

Figure 19:
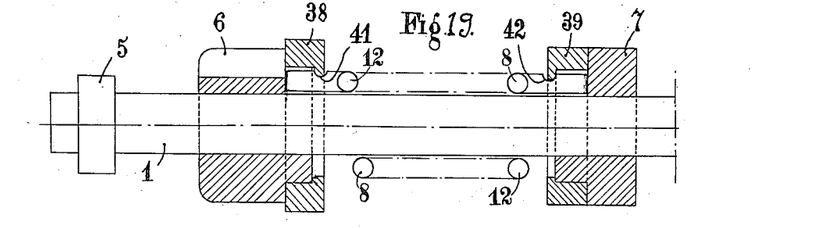
Fig. 19 is a similar view showing a further modification.

A modification of the arrangement represented in Fig. 18 is given in Fig. 19, where the split rings are replaced by shoulders fitted on the shrunk-rings 38 and 39. The slots 41 and 42 of the springs are lodged in these shoulders, and the shaft 1 being in position, the springs 8 and 12 can neither be removed nor disconnected.

Figure 20:
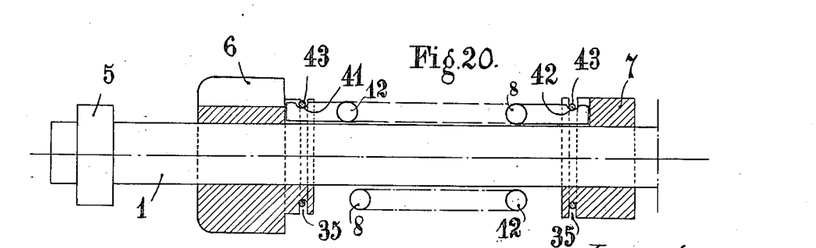
Fig. 20 is a similar view showing a still further modification.
Figure 21:
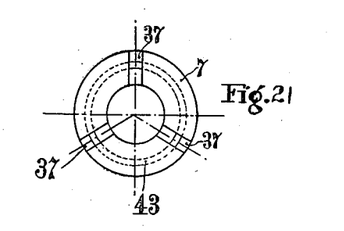
Fig. 21 is a front elevation of a driving ring corresponding to that shown in Fig. 20.
Figure 21A:
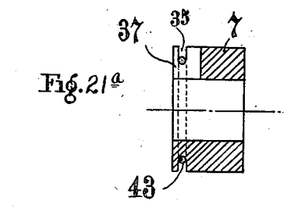
Fig. 21a is a vertical sectional view of the ring shown in Fig. 21.
Figure 22:
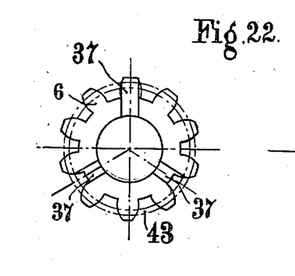
Fig. 22 is a front elevation of a pinion corresponding to that of Fig. 20.
Figure 22A:
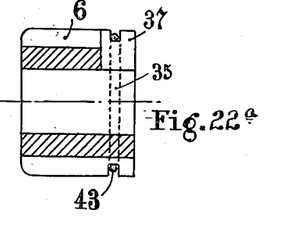
Fig. 22a is a vertical sectional view of the pinion of Fig. 22.

Fig. 20 is a modified construction of Fig. 18. In this figure the fixing method of the springs 8 and 12 is the same, but the shrunk-rings 38 and 39 are omitted.

Figure 23:
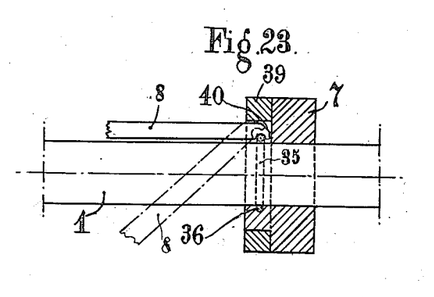
Fig. 23 is a fragmentary sectional view of a device embodying another modification.

Fig. 23 illustrates a modification in the design of springs 8 and 12, by which it is possible to disengage these springs without making it necessary to remove the shrunk-rings 38 and 39. Only the latter ring is shown in this figure, but the attachment may be applied as well to ring 38, shown in Fig. 17. The fixing end of each of the springs is provided with a bevel 40, allowing each of these springs to oscillate around the split-ring 36, as an axis, when shaft 1 is removed, and to consequently connect or disconnect them easily.

While we have shown and described the preferred embodiment of our invention, we wish it to be understood that we do not confine ourselves to the precise details herein set forth by way of illustration, as it is apparent that many changes and variations may be made therein by those skilled in the art, without departing from the spirit of the invention or exceeding the scope of the appended claims.

We claim:

1. In an engine starter drive, a rotatable shaft, a pinion adapted to be moved into and out of mesh with a member of the engine to be started, a spiral spring anchored at one end to the pinion, a collar fixed to said shaft, a spiral spring anchored at one end to said collar, said spirals having their free ends interthreaded and so arranged that unthreading thereof shifts the pinion into mesh with the engine member, and a sleeve surrounding said spirals, anchored at one end to said collar, and means adapted to engage the pinion and limit its meshing movement.

2. In an automatic starter shift, a rotatable member having a slot therein, a spiral power transmitting spring having an end adapted to seat in said slot, and a unitary retaining member cooperating with said rotatable member and spring and having means to prevent both radial and longitudinal movement of said spring from the slot.

3. In a mechanical movement, a driving shaft, a driven pinion member mounted on said shaft for free longitudinal and rotary movement on said shaft, a helical spring on said shaft and having one end fixed thereto, a similar helical spring having one end fixed to said pinion member, the free ends of said springs being threaded into each other whereby relative rotation between the springs causes the driven member to be moved along the shaft, the turns of one spring being spaced from the turns of the other spring and resilient means between the convolutions of said helical springs for resiliently maintaining the spacing between said springs and for preliminarily absorbing shock in the transfer of motion between said members.

4. A clutching device, comprising a driving shaft, a driving ring fixed on said shaft, a spring encircling the shaft and having one end fixed to said driving ring, a driving gear loosely mounted on the shaft, a second spring encircling the shaft and having one end fixed to the gear, the two springs being intermeshed, means for limiting the longitudinal movement of the driving gear on the shaft, means for resiliently resisting the longitudinal and rotary movement of the driving gear on the shaft, and a sleeve attached to the driving ring and encircling both springs.

5. Means for transforming rotary into longitudinal movement, comprising a rotary driving member, a reciprocable driven member, coaxial helical springs between said members and fixed at one end to each of said members respectively, the free ends of said springs being coiled together, means for limiting the displacement of the reciprocable driven member, and leaf springs between the convolutions of said helical springs and having a greater resiliency than said helical springs for preliminarily absorbing shock in the transfer of motion between said members.

6. In a mechanical movement, a driving shaft, a driven pinion member freely mounted on said shaft for longitudinal and rotary movement on said shaft, a driving collar fixed on said shaft, a helical spring on said shaft and having one end fixed to said collar, a similar helical spring having one end fixed to said pinion member, the turns of said springs being normally spaced apart and the free ends of said springs being threaded into each other whereby relative rotation between the springs causes the driven member to be moved along the shaft, means for limiting the displacement of said pinion on said shaft, and resilient means between the convolutions of said helical springs and having a greater resiliency than said springs for preliminarily absorbing shock in the transfer of motion between said members.

7. In a self-releasing clutch, a unit comprising a drive shaft, a driver member mounted on said shaft for rotary and longitudinal movement, said driver member being adapted, when properly positioned, to operatively engage a member to be driven, a coiled spring surrounding said drive shaft and fixed to the driver member, a coiled actuating spring attached to said drive shaft, the free end of the actuating spring being positioned between the convolutions of the spring fixed to the driver member whereby relative rotation of said springs will shift said driver member axially to engage and disengage with the member to be driven, means for limiting the displacement of said driver member on said shaft, and means for resiliently securing the driver member spring to said drive shaft.

8. In a self-releasing clutch, a rotary shaft, a pinion on said shaft adapted to be displaced to mesh with and disengage with a member to be driven, a group of spiral springs encircling said shaft, each spring having one end fixed to the pinion, a collar fixed on said shaft, a second group of spiral springs, each spring of which is fixed at one end to said collar, the free ends of the first group of springs being interthreaded with the free ends of the second group of springs so that relative rotation between the two groups of springs will effect displacement of the pinion to move the same into mesh with the member to be driven, means for resisting the displacement of the pinion on said shaft, means adapted to engage the pinion and limit its meshing movement, and resilient means between the convolutions of the springs of the two groups for preliminarily absorbing the shocks produced in the transfer of driving motion through said groups of springs from said shaft to said pinion.

9. In a self-releasing clutch, a rotary shaft, a pinion on said shaft adapted to be displaced to mesh with and disengage with a member to be driven, a group of spiral springs encircling said shaft, each spring having one end fixed to the pinion, a collar fixed on said shaft, a second group of spiral springs, each spring of which is fixed at one end to said collar, the free ends of the first group of springs being interthreaded with the free ends of the second group of springs so that relative rotation between the two groups of springs will effect displacement of the pinion to move the same into mesh with the member to be driven, means adapted to engage the pinion and limit its meshing movement, resilient means between the convolutions of the springs for preliminarily absorbing the shocks produced in the transfer of motion between said members, a sleeve surrounding the said spiral springs and having one end attached to said collar, and means carried by said sleeve for resiliently retaining said pinion in disengaged position.

10. In a self-releasing clutch, a rotary shaft, a pinion slidably and rotatably mounted on said shaft adapted to mesh with a member to be driven and to be taken out of mesh with said member, a coiled spring attached at one end to said pinion, a collar fixed on said shaft, a coiled spring attached at one end to said collar, said springs having their free ends interthreaded whereby relative rotation between the springs will effect longitudinal movement of said pinion along said shaft to mesh with the member to be driven, means for resisting the displacement of the pinion on said rotary shaft, means adapted to engage the pinion to limit its meshing movement, and resilient means between the convolutions of said springs and having a greater resiliency than said springs for absorbing the shock resulting from the engagement between said pinion and the member to be driven when the pinion is displaced to mesh with said member.

11. In a self-releasing clutch, a rotary shaft, a pinion slidably and rotatably mounted on said shaft adapted to mesh with a member to be driven and to be taken out of mesh with said member, a coiled spring attached at one end to said pinion, a collar fixed on said shaft, a coiled spring attached at one end to said collar, said springs having their free ends interthreaded whereby relative rotation between the springs will effect longitudinal movement of said pinion along said shaft to mesh with the member to be driven, means for resisting the displacement of the pinion on said rotary shaft, means adapted to engage the pinion to limit its meshing movement, resilient means between the convolutions of said springs for absorbing the shock resulting from the engagement between said pinion and the member to be driven when the pinion is displaced to mesh with said member, and a sleeve surrounding said spiral springs and having one end fixed to said collar.

12. In a self-releasing clutch, a rotary shaft, a pinion slidably and rotatably mounted on said shaft adapted to mesh with a member to be driven and to be taken out of mesh with said member, a coiled spring attached at one end to said pinion, a collar fixed on said shaft, a coiled spring attached at one end to said collar, said springs having their free ends interthreaded whereby relative rotation between the springs will effect longitudinal movement of said pinion along said shaft, means adapted to engage the pinion for limiting its meshing movement along the shaft, means for resiliently resisting the longitudinal and rotary movement of the pinion on the shaft, resilient means between the convolutions of said springs for absorbing the shock resulting from the engagement between said pinion and the member to be driven when the pinion is displaced to mesh with said member, and a sleeve surrounding said coiled springs and having one end fixed to said collar.

13. A self-releasing clutch for connecting a driver member to a device to be driven, comprising a rotary shaft driven by said driver member, a pinion mounted for sliding and rotary movement on said shaft, a helical spring loosely surrounding said shaft and having one end attached to said pinion, a collar fixed on said shaft, a second helical spring loosely mounted on said shaft and having one end attached to said collar, the free ends of said springs being interthreaded whereby relative rotation between said springs will result in an axial displacement of said pinion along said shaft to bring said pinion into driving engagement with the device to be driven, means for limiting the longitudinal displacement of the pinion on the shaft, resilient means between the convolutions of the interthreaded springs for maintaining the convolutions in axial spaced relation, and resilient means carried by said collar and adapted to engage the free extremity of the spring carried by the pinion when it is in a position of non-engagement for transmitting the initial driving effect of said collar to the spring carried by the pinion.

14. A self-releasing clutch for connecting a driver member to a device to be driven, comprising a rotary shaft driven by said driver member, a pinion mounted for sliding and rotary movement on said shaft, a helical spring loosely surrounding said shaft and having one end attached to said pinion, a collar fixed on said shaft, a second helical spring loosely mounted on said shaft and having one end attached to said collar, the free ends of said springs being interthreaded whereby relative rotation between said springs will result in an axial displacement of said pinion along said shaft to bring said pinion into driving engagement with the device to be driven, means for limiting the longitudinal displacement of the pinion on the shaft, a sleeve surrounding said springs and pinion, means for fixing said sleeve to the collar, and means carried by said sleeve for resiliently retaining the pinion and the spring associated therewith in the sleeve and to prevent their accidental displacement.

15. A self-releasing clutch, comprising a driving shaft, a driving ring loosely mounted on the shaft, a helical spring loosely encircling the shaft and having one end fixed to the driving ring, a driving gear loosely mounted for rotary and longitudinal movement of the shaft, a second helical spring loosely encircling the shaft and having one end fixed to the gear, the two springs being intermeshed, and means for resiliently connecting the driving ring to said shaft.

16. In an engine starting device of the class described, a drive shaft unit, an engine driving member on said unit for both longitudinal movement and rotary movement, said member being adapted, when properly positioned, to operatively engage an engine part to be driven, a coiled spring encircling said drive shaft unit and affixed to said engine driving member, a coiled actuating member supported upon said drive shaft unit and adapted to be positioned between the convolutions of said spring, whereby said engine driving member may be moved into and out of operative association with the engine part to be driven, and means for resiliently attaching the coiled actuating member to said drive shaft.

17. A self-releasing clutch, comprising a drive shaft, a driving collar loosely mounted on said shaft, a group of helical springs loosely encircling said shaft, each of said springs having one end attached to said collar, a driving gear loosely mounted for rotary and longitudinal movement on said shaft, a second group of helical springs loosely surrounding said shaft and each having one end attached to said gear, the two groups of springs being intermeshed with the springs of one group alternating with those of the other group, and means for resiliently connecting the driving collar to said shaft.

18. A self-releasing clutch for connecting a driver to a device to be driven, comprising a rotary shaft driven by said driver, a pinion slidably and rotatably mounted on said shaft, a helical spring loosely surrounding said shaft and having one end affixed to said pinion, a collar loosely mounted on said shaft, a second helical spring loosely mounted on said shaft having one end affixed to said collar and the free end interthreaded with the free end of the spring affixed to the pinion whereby relative rotation between said springs will shift said pinion axially of said shaft into driving engagement with said device to be driven, and means for resiliently connecting said collar to said shaft.

19. A self-releasing clutch for connecting a driver to a device to be driven, comprising a rotary shaft driven by said driver, a pinion slidably and rotatably mounted on said shaft, a helical spring loosely surrounding said shaft and having one end affixed to said pinion, a collar loosely mounted on said shaft, a second helical spring loosely mounted on said shaft having one end affixed to said collar and the free end interthreaded with the free end of the spring affixed to the pinion whereby relative rotation between said springs will shift said pinion axially of said shaft into driving engagement with said device to be driven, means for resiliently connecting said collar to said shaft, and means for limiting the longitudinal movement of the pinion on said shaft.

20. A self-releasing clutch for connecting a driver to a device to be driven, comprising a rotary shaft driven by said driver, a pinion slidably and rotatably mounted on said shaft, a helical spring loosely surrounding said shaft and having one end affixed to said pinion, a collar loosely mounted on said shaft, a second helical spring loosely mounted on said shaft having one end affixed to said collar and the free end interthreaded with the free end of the spring affixed to the pinion whereby relative rotation between said springs will shift said pinion axially of said shaft into driving engagement with said device to be driven, a second collar fixed on said shaft, and resilient means connecting said loose collar to said fixed collar.

21. A self-releasing clutch for connecting a driver to a device to be driven, comprising a rotary shaft driven by said driver, a pinion slidably and rotatably mounted on said shaft, a helical spring loosely surrounding said shaft and having one end affixed to said pinion, a collar loosely mounted on said shaft, a second helical spring loosely mounted on said shaft having one end affixed to said collar and the free end interthreaded with the free end of the spring affixed to the pinion whereby relative rotation between said springs will shift said pinion axially of said shaft into driving engagement with said device to be driven, a second collar fixed on said shaft, a sleeve carried by the second collar for housing said collars, springs and pinion when in a non-driving position, and resilient means in said housing for transmitting rotation of the sleeve to said loosely mounted collar.

22. A self-releasing clutch for connecting a driver to a device to be driven, comprising a rotary shaft driven by said driver, a pinion slidably and rotatably mounted on said shaft, a helical spring loosely surrounding said shaft and having one end affixed to said pinion, a collar loosely mounted on said shaft, a second helical spring loosely mounted on said shaft having one end affixed to said collar and the free end interthreaded with the free end of the spring affixed to the pinion whereby relative rotation between said springs will shift said pinion axially of said shaft into driving engagement with said device to be driven, a second collar fixed on said shaft, a sleeve carried by the second collar for housing said collars, springs and pinion when in a non-driving position, resilient means in said housing for transmitting rotation of the sleeve to said loosely mounted collar, and means for limiting the longitudinal movement of the pinion on said shaft.

23. A self-releasing clutch for connecting a driver to a device to be driven, comprising a rotary shaft driven by said driver, a pinion slidably and rotatably mounted on said shaft, a helical spring loosely surrounding said shaft and having one end affixed to said pinion, a collar loosely mounted on said shaft, a second helical spring loosely mounted on said shaft having one end affixed to said collar and the free end interthreaded with the free end of the spring affixed to the pinion whereby relative rotation between said springs will shift said pinion axially of said shaft into driving engagement with said device to be driven, a second collar fixed on said shaft, a sleeve carried by the second collar for housing said collars, springs and pinion when in a non-driving position, resilient means in said housing for transmitting rotation of the sleeve to said loosely mounted collar, means for limiting the longitudinal movement of the pinion on said shaft, and means for resiliently resisting the longitudinal and rotary movement of the pinion on said shaft.

24. In a self-releasing clutch, a unit comprising a drive shaft, a driver member mounted on said shaft for rotary and longitudinal movement, said driver member being adapted, when properly positioned, to operatively engage a member to be driven, a collar mounted on said shaft, means for transmitting driving motion from said shaft to said collar, a group of coiled springs encircling said drive shaft, each spring of which has one end attached to said driven member and the opposite end free and unbent, a second group of coiled springs encircling said shaft, each spring of said second group having one end attached to said collar and the opposite end free and unbent, and the springs of one group being nested with the springs of the other group, means for limiting longitudinal movement of said gear upon rotation of said driving shaft whereby when the movement of said gear is limited and a load is impressed thereon, driving torque will be transmitted thereto by means of the resiliency of said springs and the frictional resistance between said groups of springs.

25. In a self-releasing clutch, a rotatable member having a slot therein, a coiled power transmitting spring having an end adapted to seat in said slot, and retaining means cooperating with said rotatable member and spring for preventing both radial and longitudinal movement of said spring from the slot.

26. In a self-releasing clutch, a unit comprising a drive shaft, a driver member mounted on said shaft for rotary and longitudinal movement, said driver member being adapted and properly positioned to operatively engage a member to be driven, a group of coiled springs encircling said drive shaft, one extremity of each spring being fixed to said driver member, a second group of coiled springs encircling said shaft, and means for resiliently connecting said second group of springs to said shaft, said second group of springs having their free ends adapted to be put between the convolutions of the free ends of the group of springs attached to the driver member so that upon relative rotation between said driver member and shaft the driver member will be moved into and out of operative connection with the member to be driven.

27. Means for transforming rotary into longitudinal movement, comprising a rotary driving member, a reciprocable driven member, coaxial helical springs between said members and fixed at one end to each of said members respectively, the free ends of said springs being coiled together, means for limiting the displacement of the reciprocable driven member, and resilient means, having a greater resiliency than said springs, for preliminarily absorbing shock in the transfer of motion between said members.

28. A self-releasing clutch, comprising a driving shaft, a group of springs encircling the shaft, each having one end fixed thereto and the opposite end free and unbent, a driving gear loosely mounted for longitudinal and rotary movement on the shaft, a second group of springs encircling the shaft, each having one end fixed to the gear and the opposite end free and unbent, the two groups of springs being alternately intermeshed, and the springs of one group being nested with the springs of the other group, and means for limiting longitudinal movement of said gear upon rotation of said driving shaft whereby, when the movement of said gear is limited and a load is impressed thereon, driving torque will be transmitted thereto by means of the resiliency of said springs and the frictional resistance between said groups of springs.

29. A starter drive for internal combustion engines, including a driving member adapted to engage and drive a member of the engine to be started, a power member, and means for actuating said driving member comprising at least one spiral spring anchored at one end to the power member, at least one spiral spring anchored at one end to the driving member and having its free end normally nested with the free end of said first-mentioned spring whereby upon effecting relative rotation between said power member and driving member said springs will unthread, and means for limiting the unthreading of said springs to maintain an appreciable portion of said free ends interthreaded, whereby when said driving member is engaged with the member of the engine to be started torque is transmitted thereto through the resiliency of said springs and the friction between the sides thereof.

30. A method of starting an internal combustion engine which comprises first rotating a drive member to cause the same to advance in a longitudinal direction to engage a member of the engine to be started, secondly transmitting driving torque to said driving member by friction between partially interthreaded resilient elements of substantially equal extent, and thirdly causing said driving member to disengage said member of the engine to be started after the latter is started.

31. A method of transmitting rotary motion to a member to be driven, comprising effecting relative rotation between two interthreaded coaxial helical spring units to cause said units to unthread, limiting the relative axial movement of said springs to prevent complete unthreading, forming a driving connection between the outer end of one spring unit and the member to be driven, and further rotating the other spring unit to transmit driving motion through the interthreaded ends of said units to the member to be driven, the motion transmitted from one spring unit to the other being transmitted solely by the resiliency of said units and the frictional resistance therebetween.

32. A method of transmitting rotary motion from a driver to a member to be driven, comprising imparting sudden rotary movement to one of two interthreaded coaxial helical spring units whereby, due to the inertia of the other unit, unthreading and relative axial movement of said other unit will result, utilizing the axial movement of said other unit to effect a driving connection between said other unit and the member to be driven, and limiting the axial movement of said other unit to maintain an appreciable portion of said units interthreaded whereby, upon the continued application of rotary movement to the said one of the units and the impression of a load on the said other unit, driving torque will be transmitted from the said one unit to the said other unit by means of the resiliency of the springs of the units and the frictional resistance between the interthreaded portions of said units.

CHARLES ROUX.
LOUIS EUGÈNE CLÉMENCET.